US012806620B2

(12) United States Patent
Schwemmer et al.

(10) Patent No.: US 12,806,620 B2
(45) Date of Patent: Nov. 24, 2026

(54) SAMPLE CARRIER, ROTATION APPARATUS AND METHODS OF USING THE SAMPLE CARRIER AND ROTATION APPARATUS

(71) Applicant: SpinDiag GmbH, Freiburg (DE)

(72) Inventors: Frank Schwemmer, Freiburg (DE); Gregor Gross-Czilwik, Freiburg (DE); Niklas Virks, Freiburg (DE); Nils Paust, Freiburg (DE)

(73) Assignee: Dermagnostix GmbH, Freiburg (DE)

( * ) Notice: Subject to any disclaimer, the term of this patent is extended or adjusted under 35 U.S.C. 154(b) by 898 days.

(21) Appl. No.: 18/192,017

(22) Filed: Mar. 29, 2023

(65) Prior Publication Data

US 2023/0226545 A1 Jul. 20, 2023

Related U.S. Application Data

(63) Continuation of application No. PCT/EP2021/076286, filed on Sep. 23, 2021.

(30) Foreign Application Priority Data

Sep. 29, 2020 (DE) ..................... 10 2020 212 253.9

(51) Int. Cl.
*B01L 3/00* (2006.01)
*B01L 7/00* (2006.01)

(52) U.S. Cl.
CPC ........... *B01L 3/50273* (2013.01); *B01L 7/525* (2013.01); *B01L 2200/0647* (2013.01); (Continued)

(58) Field of Classification Search
CPC ................. B01L 2300/0803; B01L 2300/0806
See application file for complete search history.

(56) References Cited

U.S. PATENT DOCUMENTS 9,573,134 B2 2/2017 Hwang
2010/0279392 A1* 11/2010 Kodama .............. B01L 7/5255
435/286.1

(Continued)

FOREIGN PATENT DOCUMENTS

EP 3045523 A1 7/2016
JP 2013055921 A 3/2013

(Continued)

OTHER PUBLICATIONS

Miao et al, Free convective PCR: From principle study to commercial applications—A critical review, Analytica Chimica Acta, vol. 1108, Apr. 29, 2020, pp. 177-197.*

(Continued)

*Primary Examiner* — Aaron A Priest
(74) *Attorney, Agent, or Firm* — Laurence A. Greenberg; Werner H. Stemer; Ralph E. Locher

(57) ABSTRACT

A sample carrier is used in a rotation-based method for reproducing or detecting DNA. The sample carrier has a disc-like main part and a plurality of cavities formed in the main part, in which cavities, a sample fluid at least potentially containing DNA is received. A disc side of the main part forms a heat entry side and the flat side facing away therefrom forms a heat discharge side. The cavity or one of a plurality of cavities, as applicable, is formed by an annular channel having a first and a second channel portion, which are fluidically connected at both longitudinal ends by a connection portion in each case. The first channel portion is arranged offset relative to the second channel portion in the thickness direction of the main part.

18 Claims, 5 Drawing Sheets

(52) U.S. Cl.
CPC .................. *B01L 2300/0803* (2013.01); *B01L 2300/1805* (2013.01); *B01L 2300/1894* (2013.01); *B01L 2400/0412* (2013.01); *B01L 2400/0445* (2013.01)

(56) References Cited

U.S. PATENT DOCUMENTS

| | | | |
|---|---|---|---|
| 2016/0214112 | A1 | 7/2016 | Saito et al. |
| 2017/0246637 | A1 | 8/2017 | Saito |
| 2024/0278249 | A1 | 8/2024 | Khodakov et al. |

FOREIGN PATENT DOCUMENTS

| | | | | |
|---|---|---|---|---|
| JP | 2013516975 | A | 5/2013 | |
| JP | 2017148016 | A | 8/2017 | |
| JP | WO2016158831 | A1 | 1/2018 | |
| JP | 2019509751 | A | 4/2019 | |
| WO | 2018011085 | A1 | 1/2018 | |
| WO | WO-2018091549 | A1 * | 5/2018 | ........ B01L 3/502738 |

OTHER PUBLICATIONS

Masato Saito, Development of the POCT-oriented biosensing system and applications, Production and technology, 2019, vol. 71, No. 3, pp. 64-66.

Miao Guijun et al, "Free convective PCR: From principle study to commercial applications—A critical review", Jan. 31, 2020 (Jan. 31, 2020), Band 1108, Seite 177-197, XP086104561, DOI: 10.1016/J.ACA.2020.01.069 external link, ISSN:0003-2670 , [found on Jan. 31, 2020], the whole document.

Madhavi Krishnan et al, "PCR in a Rayleigh-Bénard Convection Cell", Science,Band 298, Oct. 25, 2002 (Oct. 25, 2002), p. 793, XP055151409, the whole document.

* cited by examiner

SAMPLE CARRIER, ROTATION APPARATUS AND METHODS OF USING THE SAMPLE CARRIER AND ROTATION APPARATUS

CROSS-REFERENCE TO RELATED APPLICATION

This application is a continuation, under 35 U.S.C. § 120, of copending International Patent Application PCT/EP2021/076286, filed Sep. 23, 2021, which designated the United States; this application also claims the priority, under 35 U.S.C. § 119, of German Patent Application DE 10 2020 212 253.9, filed Sep. 29, 2020; the prior applications are herewith incorporated by reference in their entirety.

FIELD AND BACKGROUND OF THE INVENTION

The invention relates to a sample carrier for use in a method for amplification of DNA, and to a rotation device which is likewise configured and provided for use in such a method. The invention further relates to the use of such a sample carrier and of such a rotation device in a method for amplification of DNA.

DNA (deoxyribonucleic acid), in addition to being used in scientific genetic analyses, paternity tests and the like, is often analyzed in order to identify existing diseases or to detect pathogens. On account of the spread of SARS-CoV-2 and the tests required for detection, this use has also become relatively well known. For the analysis (or detection), starting from a sample, e.g. a smear, a blood sample or the like, specific regions of a DNA contained therein (optionally also RNA) have to be amplified. If RNA is detected or analyzed in a sample (e.g. to detect a virus), it is first of all transcribed into DNA by what is called reverse transcription and is then amplified.

In order to amplify the DNA, the so-called polymerase chain reaction (PCR) is usually used in a liquid reaction mixture. The DNA is typically in the form of a double helix structure, consisting of two complementary single strands of DNA. In the PCR, the DNA is first of all separated into two individual strands by an increased temperature of the liquid reaction mixture of between typically 90 and 96 degrees Celsius ("denaturation phase").

The temperature is then lowered again ("annealing phase", typically to a range of 50-70 degrees Celsius) in order to enable specific attachment of what are called primer molecules onto the individual strands. The primer molecules are complementary, short DNA strands that bind to the individual strands of the DNA at a defined point. The primers serve as a starting point for an enzyme, the so-called polymerase, which in the so-called elongation phase fills in the basic building blocks ("dNTPs") of the DNA to complement the existing DNA sequence of the individual strand. Starting from the primer molecule, a double-stranded DNA is formed again. The elongation is typically performed at the same temperature as in the annealing phase or at a slightly elevated temperature, typically of between 65 and 75 degrees Celsius. After the elongation, the temperature is increased again for the subsequent denaturation phase. The primer molecules and the abovementioned basic building blocks are also present in the reaction mixture. These are usually contained in a starting mixture to which the sample is fed.

This above-described cycling of the temperature in the liquid reaction mixture between the two to three temperature ranges is called PCR thermocycling and is typically repeated in 30 and 50 cycles. In each cycle, the specific DNA region is amplified. Typically, the thermocycling of the liquid reaction mixture is implemented in a reaction vessel by controlling the external temperature. The reaction vessel is located, for example, in a thermal block, in which the PCR thermocycling takes place by heating and cooling of a solid that is located in thermal contact with the reaction vessel. In this way, heat from the liquid in the reaction mixture is supplied or removed. Alternative heating and cooling concepts for implementing the PCR thermocycling include controlling the temperature of fluids (in particular air and water), which flow around the reaction vessel, and also radiation-based concepts, e.g. by introduction of heat through IR radiation or laser radiation.

In a conventional polymerase chain reaction, the process times are typically in the range of 45 minutes to 3 hours and are therefore comparatively time-consuming.

SUMMARY OF THE INVENTION

The object of the invention is to accelerate a polymerase chain reaction, in particular the entire course of the analysis.

This object is achieved, according to the invention, by a sample carrier having the features of the independent sample carrier claim. Furthermore, this object is achieved, according to the invention, by a rotation device having the features of the independent rotation device claim. This object is also achieved, according to the invention, by a use having the features of the independent use claims. Advantageous and in some cases themselves inventive embodiments and developments are set forth in the dependent claims and in the following description.

The sample carrier according to the invention and the rotation device according to the invention are preferably used together, but alternatively also independently of each other (i.e. the sample carrier independently of the rotation device, and vice versa) in a method for amplification or detection of DNA. According to the method, a sample carrier (or the sample carrier according to the invention), specifically at least one cavity of the sample carrier, is preferably first of all filled with a sample liquid which preferably or (e.g. in the case of an examination for pathogens) at least potentially contains DNA. The sample carrier is then rotated about an axis of rotation by means of a rotation device (or the rotation device according to the invention). The cavity, preferably the sample carrier, is heated to a high temperature value by means of a heating device on a heat input side lying in (i.e. in particular parallel to) a plane of rotation. There is preferably no heating on the side opposite the heat input side. As a result of the heating, a convection flow of the sample liquid is generated within the cavity. Preferably, the convection flow is generated substantially in a ring shape, with a first flow section in particular extending approximately parallel to the heat input side, a second flow section extending from the heat input side to the opposite heat output side (also "cooling side"), a third flow section extending parallel to the heat output side, and a fourth flow section extending again (from the heat output side) back to the heat input side. As a result, the sample liquid is preferably guided through a denaturation zone (which in particular has a high temperature value), a so-called annealing zone (also primer hybridization zone) and an extension zone, and back to the denaturation zone. A period of circulation of a liquid particle of the sample liquid along a flow path of the convection flow is predefined (in particular "controlled") in particular by means of the speed of the rotation.

In particular, the period of circulation of the liquid particle is also influenced by other parameters, such as the geometry of the cavity, the viscosity of the sample liquid, the density of the sample liquid, the resulting temperature gradient and the like.

In other words, on account of the above-described heating of the cavity on one side, a temperature gradient (which is therefore oriented in a decreasing direction from the heat input side to the heat output side) preferably perpendicular to a dominant force, in particular the centrifugal force resulting from the rotation, is preferably applied to the sample liquid in the cavity.

In particular, a fluid exchange required for the polymerase chain reaction takes place between the denaturation zone and the annealing zone via the above-described flow portions or flow sections (i.e. the second and fourth flow sections) directed perpendicularly to the plane of rotation.

Preferably, in addition to the four flow sections described above, there are also portions flowing transversely thereto on account of the centrifugal force and/or the Coriolis force. This advantageously leads to an additional mixing of the sample liquid, thereby permitting the most homogeneous possible mixing of reaction partners, i.e. DNA to be amplified, primer molecules and "strand building blocks".

The term "period of circulation" is understood here and in the following to mean in particular the period (time) which the (in particular infinitesimal) liquid particle requires in order to flow through the denaturation zone, the annealing zone (also primer hybridization zone) and the extension zone and back to the denaturation zone. The period of circulation can be set to times in the range of between 0.1 s and 20 s by means of the number of revolutions (thus by means of the speed of rotation). An average flow velocity of the order of up to 22 mm/s can thus be set within the corresponding cavity, which corresponds to a reaction chamber of the sample carrier.

A particularly rapid polymerase chain reaction is made possible by such a short period of circulation and/or by such a high flow velocity, such that process time can advantageously be saved.

In a preferred variant of the method, the corresponding cavity is cooled, on the heat output side (or also "cooling side") opposite the heat input side, to a low temperature value compared to the high temperature value on the heat input side. As a result, the temperature of the annealing zone (and of the extension zone optionally contained therein) can advantageously be set, and in particular the sample liquid in the region of the annealing zone can be prevented from heating up increasingly or at least to a negligible extent.

The sample carrier according to the invention is configured and provided for use in the rotation-based method for amplification of DNA as described above and also in the following. The sample carrier has a disk-like base body. In addition, the sample carrier has a number of preferably microfluidic cavities formed in the base body, in which, in an intended method step, a sample liquid which at least potentially (especially in the case of an analysis for the presence of pathogens) contains DNA (or optionally alternatively RNA) is received. A flat side (or disk side) of the base body preferably forms a heat input side, and the flat side (or disk side) facing away therefrom (i.e. the heat input side) forms in particular a heat output side (also referred to as a "cooling side"). The cavity or one of possibly several cavities is formed by an annular channel, i.e. preferably a loop-like or ring-like channel, with a first and a second channel section. These two channel sections (i.e. the first and second) are at least indirectly fluidically connected at both longitudinal ends by means of a respective connection section (or connection channel). The first channel section is also arranged offset with respect to the second channel section in the thickness direction (i.e. in particular in the direction of the intended axis of rotation) of the base body. In other words, one of the two channel sections is offset toward the heat input side and the other toward the cooling side.

Here and in the following, "disk-like" is understood in particular in the sense of "plate-like", i.e. in particular in the sense that the corresponding body has a planar extent that is many times greater than its thickness, preferably fundamentally independently of the geometry of its outer contour delimiting the planar extent.

Here and in the following, the term "number of" is understood in particular in the sense of the term "quantity", such that a number of elements describes both just a single element and also at least two elements.

Here and in the following, "microfluidic" is understood in particular as meaning that the at least one cavity has dimensions of less than 0.5 or even 0.1 millimeter up to 10 to 15 millimeters. In particular, at least one dimension, for example a width or depth, is in the range of less than 0.5 millimeter. A longitudinal extent, in particular of cavities forming a channel, can also exceed the 15 millimeters described above.

The annular channel preferably forms a process chamber or reaction chamber in which a polymerase chain reaction (PCR) takes place when the sample carrier is used as intended. This is supported by the shape of the cavity as an annular channel, since a flow driven by convection and gravity can form particularly easily in this way, with the respective "liquid particles" flowing through the individual channel sections one after another in accordance with the above description. In particular, the liquid particles in the more heated channel section can "rise" counter to the centrifugal force during rotation, whereas the cooler and therefore denser or heavier liquid particles in the other channel section "sink" in the direction of the centrifugal force. The second and fourth flow sections described above run here through the connection channels between the first and second channel sections. In particular, mixing and movement and thus processing of the entire sample liquid accommodated in the annular channel is improved. The offset of the first channel section and of the second channel section toward the heat input side or toward the cooling side (i.e. in the direction of thickness) also advantageously allows the heat input and the heat output (i.e. in particular the cooling) to affect primarily the corresponding (i.e. closer) channel section, preferably limited thereto. In other words, the effect of the cooling on the channel section offset toward the heat input side is reduced. The opposite applies to the channel section offset in the direction of the cooling side.

Preferably, the first channel section is arranged on the heat input side (i.e. toward the latter) and the second channel section is arranged on the cooling side of the sample carrier (i.e. offset toward this). In the intended use, the first channel section is preferably used for introducing heat into the sample liquid, and the second correspondingly for discharging heat. More preferably, the first and second channel sections are also aligned parallel to the direction of the centrifugal force (applied during the intended processing) (i.e. in particular radially with respect to the axis of rotation about which the sample carrier is rotated when used as intended).

In an expedient embodiment, the first channel section (in the abovementioned case) has a reduced cross-sectional area (at least in some regions) compared to the second channel section (which is arranged offset to the cooling side). The reduced cross-sectional area leads on the one hand to an increase in the flow velocity and consequently also to a reduced dwell time of the individual "liquid particles" in the first channel section. In addition, the surface available for the heat input is usually smaller, and therefore the possible heat input is limited.

In a further expedient embodiment, the first channel section, which is preferably arranged on the heat input side (i.e. offset toward the latter), has (in addition to or as an alternative to the reduced cross-sectional area), compared to the second channel section which is arranged in particular on the cooling side, (at least in some regions) a reduced channel width oriented in the disk surface direction of the base body. As a result, the "attack surface" for the heat input is smaller than that for the heat output. As a result, the heat output can be matched to the heat input. In particular, this makes it possible to design the cooling in a particularly simple manner, in particular using ambient atmosphere. Active and thus energy-intensive generation of cold can thus advantageously be omitted. Active heating, by contrast, is generally required anyway.

Particularly in the embodiment in which the second channel section is offset to the cooling side, the second channel section contains, in an expedient embodiment, a cooling channel and, adjoining the latter preferably in the intended direction of flow of the sample liquid during the processing, an annealing channel configured with a channel width that is reduced compared to the cooling channel. In this case, the cooling channel serves to allow the process liquid to be cooled as quickly as possible. By contrast, the cooling within the annealing channel is reduced, such that the temperature conditions here are as constant as possible. Optionally, the cross-sectional area of the cooling channel and of the annealing channel is the same and/or chosen in such a way that the annealing channel has a greater "depth", i.e. a greater extent in the thickness direction of the base body. In particular in the former case, the flow velocity also remains at least approximately the same. Alternatively, however, the cross-sectional area of the annealing channel is also reduced compared to the cooling channel, such that the flow velocity is increased here and the dwell time is therefore also reduced. Irrespective of the designations "cooling channel" and annealing channel, DNA basic building blocks can already be deposited inside the cooling channel on denatured DNA strands fed in from the first channel section on account of the heating that takes place there.

In a preferred embodiment, the annealing channel alternatively has the same channel width as the cooling channel, but in contrast to the latter the greater depth. As a result, the volume in the annealing channel is enlarged compared to the cooling channel, such that the cooling is opposed by a larger amount (specifically a larger volume) of sample liquid, and the cooling is thus slowed down.

In an optional embodiment, the first channel section also comprises two sub-chambers (or "sub-sections"), which are designated as "denaturation channel" and "resistance channel". The resistance channel lies "upstream", i.e. ahead of the denaturation channel in the intended direction of flow (and thus in particular downstream of the annealing channel). In addition, the resistance channel is configured with a reduced width compared to the denaturation channel, preferably with a reduced cross-sectional area. As a result, the sample liquid is accelerated in the resistance channel. In particular, however, this resistance channel influences on the one hand the flow velocity in the annealing channel and on the other hand also (e.g. to more than 40, preferably more than 50%) the fluid resistance within the annular channel and thus the period of circulation of a (at least theoretical) liquid particle through the respective channel sections. The period of circulation in turn affects the amount of heat absorbed and given off and therefore the temperature values occurring within the sample liquid. In this way, the resistance channel advantageously also represents a "control element" in terms of design for the respective temperature values within the sample liquid.

Alternatively, the denaturation channel is omitted. Particularly with suitable process control, for example with heating from the outside and/or a comparatively low speed of rotation, the denaturing can also take place in the first channel section, which in this case is in particular configured only as a resistance channel.

The above-described shaping (or "structuring") of the annular channel advantageously permits specification (or "control") of the period of circulation and of the individual temperature values by means of the channel cross sections or channel profiles and/or by means of the speed of rotation. In particular, the channel geometry can be adapted to the process parameters (e.g. heating and cooling temperature values) specified by means of an analysis device (in particular the rotation device described in more detail below), in such a way that a time limit is not (or no longer) primarily specified by heating or cooling periods, but at least 20% or more by biochemical processes.

In an expedient embodiment, in addition to the offset in the direction of thickness, the first and the second channel section are offset with respect to each other in the direction of the disk surface.

In a further expedient embodiment, the sample carrier has a thermal insulation layer. The latter is arranged underneath the second channel section at least along part of its length in the direction of the heat input side (or, depending on the viewing direction, arranged over it; in general terms, the thermal insulation layer is thus arranged between the second channel section and the heat input side). As a result, the heat input from the heating chamber into the second channel section is advantageously suppressed (more so in particular in the case of the offset in the direction of thickness) during the intended operation. Optionally, the thermal insulation layer is only assigned to (e.g. arranged underneath) the cooling channel described above, such that the heat input into the cooling channel is prevented or at least reduced to a negligible extent, and the heat output significantly predominates. In this optional case, a heat input into the subsequent annealing channel is therefore "allowed", such that the sample liquid in this channel is only cooled to a lesser extent or the temperature can be kept constant even approximately (i.e. with a difference of a few degrees Celsius, for example equal to or less than 10 or 5 degrees Celsius).

In a preferred embodiment, the annular channel is connected to a bubble trap chamber in an inlet region through which the annular channel is filled (in particular with the sample liquid) during the intended use. In this case, a gate that connects the bubble trap chamber to the annular channel is preferably of such great thickness that it is possible for gas bubbles that normally occur to pass through from the annular channel into the bubble trap chamber. For example, a thickness of the gate of at least 100 micrometers, especially at a rotation speed of 20 Hz, is sufficient for the gas bubbles to pass through into the bubble trap chamber. Gas bubbles appear in particular as a result of the heating of the sample liquid. If the gas bubbles remain in the annular channel, they can lead to a blockage, similar to a gas embolism, at transitions where there is a particularly small cross section, i.e. in particular at narrow slits. When the sample carrier is used as intended in the abovementioned method, the annular channel is preferably filled with enough sample liquid for the sample liquid to at least partially fill the bubble trap chamber. This further simplifies the flow of the bubbles out of the annular channel into the bubble trap chamber, since there is no liquid-gas interface that needs to be overcome. In addition, the bubble trap chamber is expediently arranged radially to the inside of the annular channel, during the intended rotation of the sample carrier. As a result, the gas bubbles, which are lighter than the sample liquid, can "rise" counter to the rotation-driven gravitational field, i.e. move radially inward.

A bubble trap chamber is preferably provided in each case for the first and second channel sections, which also preferably extend in the radial direction.

In an optional embodiment, the annular channel has a third channel section which is fluidically connected between the first and the second channel section, in particular downstream of the second channel section. The third channel section is preferably oriented (at least approximately) parallel to the first and the second channel section. Viewed in the thickness direction of the base body of the sample carrier, however, the third channel section is arranged between the first and the second channel section. As a result, during the intended operation, a temperature value lying between the respective (mean) temperature values of the first and second channel section preferably forms within the third channel section. For example, the target temperature values in the first channel section are around 85 to 100, in particular 95 degrees Celsius, in the second channel section around 50 to 75, preferably around 60 degrees Celsius and (if present) in the third channel section around 65 to 80, preferably around 72 degrees Celsius, e.g. to support an elongation of the DNA.

In a further optional embodiment, the sample body has several of the annular channels described above, each of them having different structures (i.e. preferably dimensions, in particular with regard to their cross sections and widths). This results in different dwell times of the sample liquid in the individual regions, so that tests can be carried out in one sample carrier, in particular given constant heating and cooling conditions, with different process parameters (in particular different temperature values and/or circulation times), optionally with different biochemistry.

The rotation device according to the invention, described in more detail below, optionally represents an independent invention and is therefore independent of the sample carrier described above. Nevertheless, the use of the above-described sample carrier in the rotation device described here and below is particularly advantageous. The rotation device according to the invention is configured and provided for use in the rotation-based method described above. For this purpose, the rotation device has an analysis chamber, and a sample holder arranged in the analysis chamber. The sample holder is for holding at least one sample carrier, in particular the sample carrier described above, which has a number of cavities formed in the (or a) base body, wherein a sample liquid that at least potentially contains DNA is received in a specified method step. Furthermore, the rotation device has a rotary drive, by means of which the sample holder is rotated about an axis of rotation during the intended operation. Furthermore, the rotation device has a heating device, by means of which an atmosphere in a subregion of the analysis chamber forming a heating chamber is controlled to a target heating temperature during the intended operation, and a cooling device, by means of which an atmosphere in a subregion of the analysis chamber forming a cooling chamber is controlled to a target cooling temperature during the intended operation. The heating chamber and the cooling chamber are fluidically separated from each other by the sample holder, at least in cooperation with the sample carrier held thereon. In addition, the rotation device has a controller (also referred to as "control device"), which is linked in terms of control technology to the rotary drive and the heating device and also to the cooling device and is configured to specify a speed of rotation of the sample holder and also the target heating temperature and the target cooling temperature.

The heating and cooling therefore preferably take place via the respective temperature-controlled atmosphere of the heating or cooling chamber. The respective atmosphere is particularly preferably air. This results in a particularly simple set-up of the rotation device.

In a preferred embodiment, the controller is formed at least at its core by a microcontroller with a processor and a data memory, in which the functionality for performing the method is implemented in the form of operating software (firmware), so that the method, optionally in interaction with operating personnel, is carried out automatically when the operating software is executed in the microcontroller. Alternatively, within the scope of the invention, the controller can however also be formed by a non-programmable electronic component, e.g. an ASIC, in which the functionality for performing the method is implemented using circuitry means.

In a preferred embodiment, the rotation device has a housing that encloses the analysis chamber and thus the heating chamber and the cooling chamber together. In other words, the housing does not divide the analysis chamber. Rather, the division into the heating chamber and the cooling chamber is effected by the sample holder or sample carrier. The sample holder, or the sample carrier held thereon during the intended operation, forms a sealing gap together with a housing wall, in particular with a side wall of the housing. This sealing gap is dimensioned in such a way that reduction or even suppression of a gas exchange between the heating chamber and the cooling chamber is made possible. For example, the sealing gap has a width (i.e. a distance between the sample holder or sample carrier and the side wall) equal to or preferably less than 1 mm, in particular equal to or less than 0.5 mm.

In a development that is advantageous as regards the sealing effect between the heating and cooling chambers, the housing wall forms, with the sample holder or the sample carrier, a kind of labyrinth seal between the heating chamber and the cooling chamber. Labyrinth seals generally provide a comparatively high sealing effect in contactless sealing concepts. In this case, a circumferential groove is preferably formed into the housing wall, in particular the side wall, into which groove the sample holder or sample carrier engages. The sealing gap here also has dimensions of preferably equal to or less than 1 mm.

The analysis chamber is preferably designed as a circular cylinder. The sample holder on its own, or at least with one or more sample carriers attached to it, reproduces a circular disk. As a result, the sealing gap is preferably the same all the way round. In the case of the labyrinth seal, the housing can preferably be opened or dismantled for loading the sample holder and optionally also for maintenance purposes.

In this case, a parting plane of the housing is expediently arranged in the groove described above.

In a further expedient embodiment, the sample holder of the rotation device is configured to accommodate the sample carrier on a heat input side (here of the sample holder) facing the heating chamber. This is particularly the case when the rotary drive is arranged in the region of the cooling chamber. Alternatively, however, it is equally possible to position the rotary drive on the side of the heating chamber, so that the sample holder receives the sample carrier in particular on the cooling side (of the sample holder) facing the cooling chamber. In each case, the sample holder has at least one window connecting the heat input side and the cooling side (of the sample holder). During the intended operation, a region of the number of cavities that is to be cooled or heated (in particular the first or second channel section) of the sample carrier is connected through this window to the cooling chamber or the heating chamber for heat transfer. That is to say, the region to be cooled (in particular the second channel section) of the sample carrier is connected to the cooling chamber in the case where the sample carrier is positioned on the heat input side of the sample holder (and thus in the heating chamber). In the case of the above-described sample carrier according to the invention, its channel section (in particular the second channel section) offset toward the cooling side optionally protrudes into the window or through the latter toward the cooling side. In the case where the sample carrier is to be arranged on the cooling side of the sample holder, this applies analogously to the region that is to be heated.

In an optional embodiment, preferably for the case where the sample carrier according to the invention is used with the rotation device, the sample holder has a thermal insulation layer. The latter is arranged in such a way that at least part of the region of the number of cavities of the sample carrier that is to be cooled and/or heated is shielded from the temperature effect of the heating chamber or cooling chamber during the intended operation. This is the case in particular when the sample carrier itself does not have a thermal insulation layer. The thermal insulation layer of the sample holder is optionally formed by an element arranged separately on the sample holder, for example a material with low thermal conductivity. The thermal insulation layer of the sample holder serves the same purpose as the above-described thermal insulation layer of the sample carrier according to the invention.

In an expedient embodiment, the cooling device of the rotation device has a controllable valve for connecting the cooling chamber to the environment of the rotation device and/or a fan for (in particular actively) flooding the cooling chamber with ambient atmosphere, preferably ambient air. Active cooling by means of a kind of air conditioning system or the like (that is to say with active refrigeration) can thus be omitted. This is particularly advantageous in the sense that this embodiment, with the controllable valve or the fan, is technically easy to implement. The target cooling temperature in the cooling chamber is specified in particular by the controller at approximately 50 degrees Celsius (i.e. with a deviation of, for example, +/−5 degrees Celsius). This temperature value, which is quite high compared to the usual ambient temperature, arises on account of (optionally targeted) leakage through the above-described sealing gap and/or from thermal conduction effects through the sample holder. To control the temperature to this temperature value, a temperature sensor is preferably arranged in the cooling chamber and connected to the controller. As the temperature rises, the controller opens the valve or valves, so that an exchange with the environment can take place. If applicable and if present, the controller also activates the fan in order to be able to transport more ambient atmosphere, in particular air, through the cooling chamber and thereby increase the cooling effect.

The controller is preferably configured to control the heating device in such a way that a temperature value of approximately 80 to 120 degrees Celsius is present in the heating chamber. For this purpose, a temperature sensor is preferably also arranged in the heating chamber. The heating device optionally has heating wires, surface heating or the like. Since, during the intended operation, the sample holder rotates with the sample carrier held thereon, the atmosphere in the heating chamber is advantageously set in a swirling motion and the temperature is thus homogenized. In addition, on account of the movement of the sample carrier relative to the atmosphere, the convective heat transfer is improved, in particular since standing boundary layers, between the sample carrier and the heating chamber, that have an insulating effect are repeatedly broken up or do not form.

According to the invention, the above-described sample carrier according to the invention is used in the method described at the outset. The sample carrier is thus first filled with the sample liquid, which at least potentially contains DNA, and is rotated about an axis of rotation by means of a rotation device, optionally the above-described rotation device according to the invention. At least the first channel section is heated to a high temperature value, at least in some sections, by means of the atmosphere that is temperature-controlled by the heating device, as a result of which a convection flow of the sample liquid is generated within the annular channel of the corresponding cavity. As an alternative to the rotation device according to the invention, it is optionally possible to use one which, instead of the heating device described above, has contact or surface heating, preferably integrated in the sample holder, for controlling the temperature of the atmosphere in the heating chamber. In this case, the first channel section (or the one to be heated) is heated on one side by thermal conduction, for example by means of a Peltier element or a resistance heater.

Further according to the invention, the above-described rotation device according to the invention is used in the method described at the outset. Optionally, a sample carrier other than the above-described sample carrier according to the invention can also be used here. However, the sample carrier according to the invention is preferably used. Within the scope of the method, at least one section of the cavity or of one of possibly several cavities of the sample carrier is heated, at least in some sections, to a high temperature value by means of the atmosphere that is temperature-controlled by means of the heating device, and another section (preferably of the same cavity) is preferably cooled by means of the preferably cooler atmosphere present in the cooling chamber. On account of the heating, in particular on account of the temperature difference brought about by the additional cooling, a convection flow of the sample liquid is generated within the corresponding cavity.

Other features which are considered as characteristic for the invention are set forth in the appended claims.

Although the invention is illustrated and described herein as embodied in a sample carrier and a rotation apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts are always provided with the same reference signs in all of the figures.

Figure 1:
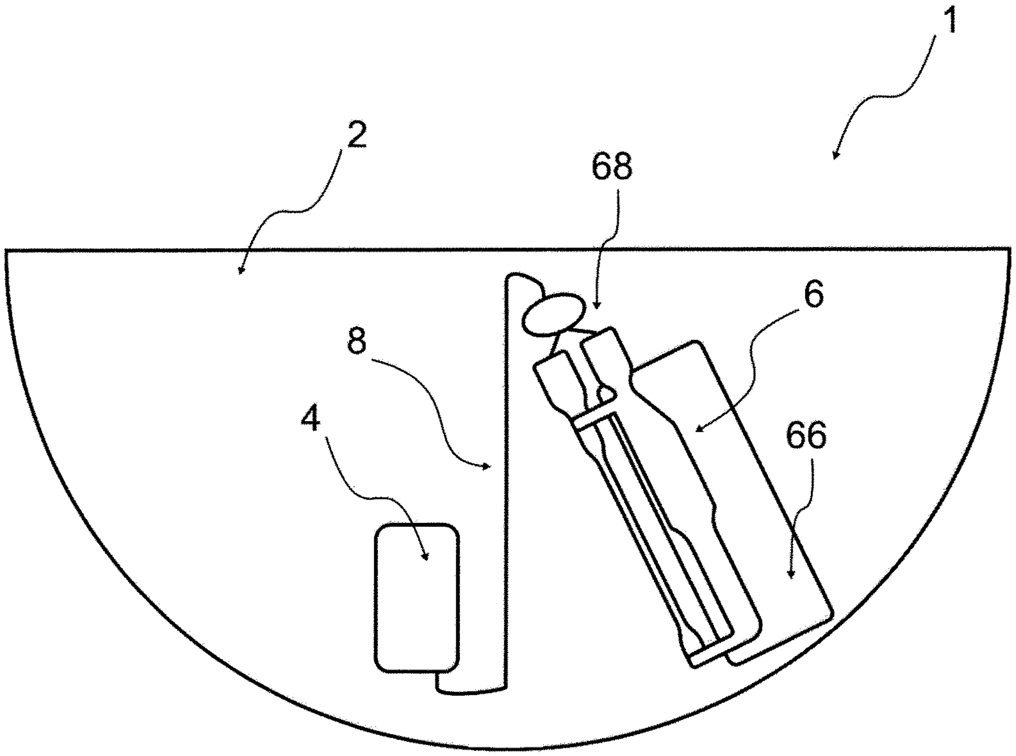
FIG. 1 is a schematic view of an underside of a sample carrier with a number of cavities.

Referring now to the figures of the drawings in detail and first, particularly to FIG. 1 thereof, there is shown a sample carrier 1 in a roughly schematic manner, which is configured and provided for use in a rotation-based method for amplification or detection of DNA, described in more detail below with reference to FIG. 4. The sample carrier 1 has a disc-shaped, i.e. flat, base body 2 which is semicircular in the present exemplary embodiment. Several microfluidic cavities are formed in the base body 2, of which FIG. 1 shows merely by way of example a filling chamber 4, into which a sample taken can be introduced, a process chamber 6 arranged "downstream" thereof, and a connection channel 8 between these two. The size of the process chamber 6 in relation to the base body 2 is shown here in a greatly exaggerated manner in order to illustrate the properties described in more detail below.

Figure 2:
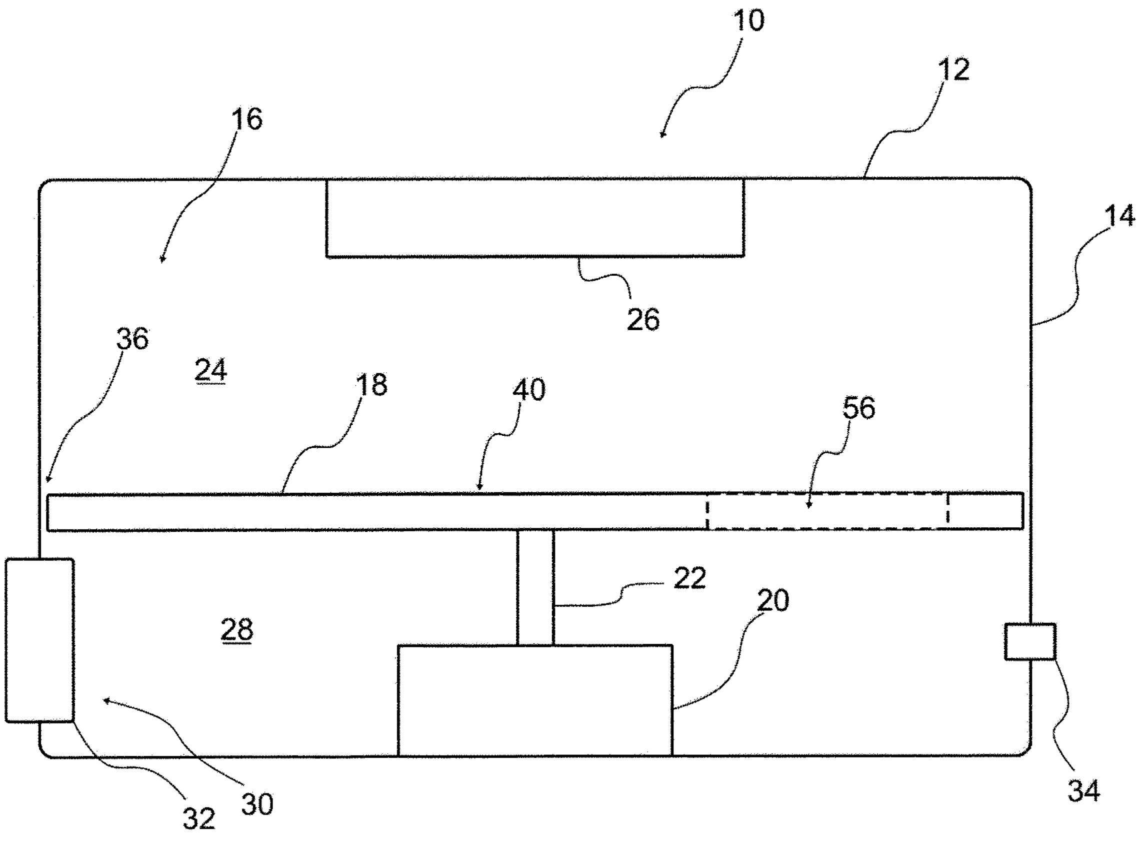
FIGS. 2 and 3 are schematic and quasi-transparent side views each showing an alternative exemplary embodiment of a rotation device used in a method.
Figure 3:
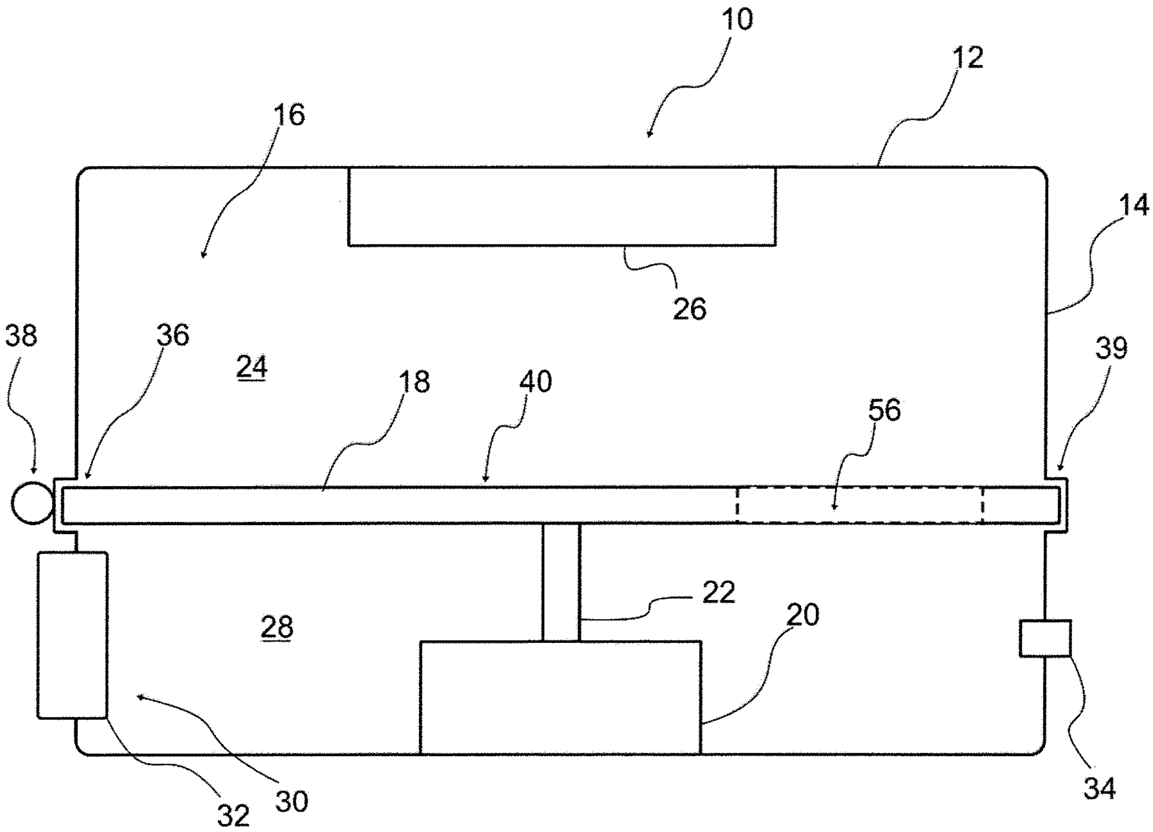

FIGS. 2 and 3 show two exemplary embodiments of a rotation device 10 which is likewise configured and provided for use in a rotation-based method for amplification of DNA, preferably together with the sample carrier 1. The rotation device 10 has a housing 12 which, with its side wall 14, encloses a circular cylindrical housing interior, referred to below as "analysis chamber 16". Furthermore, the rotation device 10 has a sample holder 18. The sample carrier 1 is mounted on the latter when the method is being carried out (i.e. during the intended operation). The sample holder 18 can be rotated about an axis of rotation 22 by means of a rotary drive 20. Thus, the sample holder 18 is a turntable.

The sample holder 18 is arranged in the analysis chamber 16 in such a way that it divides the latter into two parts. The upper part in FIGS. 2 and 3 forms a heating chamber 24. The rotation device 10 has a heating device 26 which is configured to heat the atmosphere, specifically the air in the heating chamber 24. The lower part of the analysis chamber 16 in FIGS. 2 and 3 forms a cooling chamber 28. The rotation device 10 has a cooling device 30 for its temperature control. In the exemplary embodiment shown, there is shown a fan 32 by means of which, during the intended operation, a flow of cooling air, formed by air sucked in from outside, flows through the cooling chamber 28. In addition, the cooling device 30 contains a controllable valve 34 through which air can be discharged from the cooling chamber 28 into the environment or can be admitted without the fan 32 being activated.

A controller of the rotation device 10 for controlling the rotary drive 20, the heating device 26 and the cooling device 30, i.e. the fan 32 and the valve 34, is present but not shown in any detail.

In order to keep the passage of warm air from the heating chamber 24 into the cooling chamber 28 as small as possible, a sealing gap 36 between the side wall 14 and the sample holder 18 is kept at less than 1 mm.

In a further exemplary embodiment, the housing 12 can be folded open up by means of a joint 38 between the heating chamber 24 and the cooling chamber 28. As a result, the sample holder 18 can be easily loaded and/or the rotation device 10 serviced. The outer edge of the sample holder 18 lies in a groove 39 which is worked into the side wall 14. This creates a labyrinth seal (see FIG. 3). In principle, the housing 12 of the exemplary embodiment according to FIG. 2 can also be folded open in order to be able to load the sample holder 18, but not necessarily in the plane of the sample holder 18.

In a further exemplary embodiment, which is not shown, the sample carrier 1 is automatically drawn into the rotation device 10, comparable to a CD or DVD drive.

Furthermore, in an expedient exemplary embodiment, the rotation device 10 has a code reader for reading in, for example, barcodes and/or QR codes, by means of which an analysis result for the current sample can be forwarded in a specified manner to a database via a network.

Figure 4:
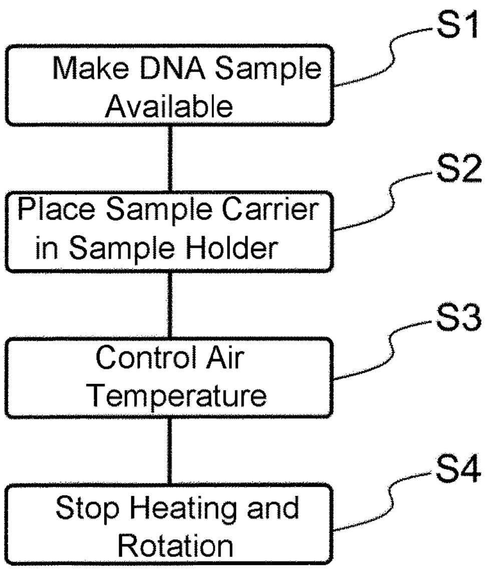
FIG. 4 is a flowchart illustrating a method for amplification of DNA.

For the amplification of DNA, the sample carrier 1 and the sample containing DNA are made available in a first method step S1 (see FIG. 4). The sample liquid forms after the sample has been introduced into the filling chamber 4 and, in addition to the DNA to be amplified, it also contains primer molecules, deoxynucleoside triphosphates ("dNTPs"), structural building blocks for the formation of new DNA strands, and also polymerase and co-factors of the polymerase. In addition, the liquid is buffered. A liquid is preferably stored in the filling chamber 4 or in another chamber (not shown) and is used to "wash out" the sample material from a sample carrier (e.g. a swab) and as a carrier liquid for the abovementioned reagents. Optionally, some of these reagents are also only added in the form of upstream (dry) substances in the process chamber 6. In a second method step S2, the filled sample carrier 1 is placed onto the sample holder 18 and fastened to it. The sample carrier 1 rests on a heat input side 40 of the sample holder 18 located in the heating chamber 24.

In a third method step S3, the air in the heating chamber 24 is controlled to about 100 degrees Celsius by means of the heating device 26. In the method described, this represents a high temperature value. In parallel with this, the rotary drive 20 drives the sample holder 18 to rotate about the axis of rotation 22, such that each cavity of the sample carrier 1 is also rotated about the axis of rotation 22. The air in the cooling chamber 28 is controlled to a low temperature value of approximately 50 degrees Celsius by means of the cooling device 30. As a result of the rotation of the sample holder 18, there is also a movement and therefore mixing of the air in the heating chamber 24 and in the cooling chamber 28.

Figure 5:
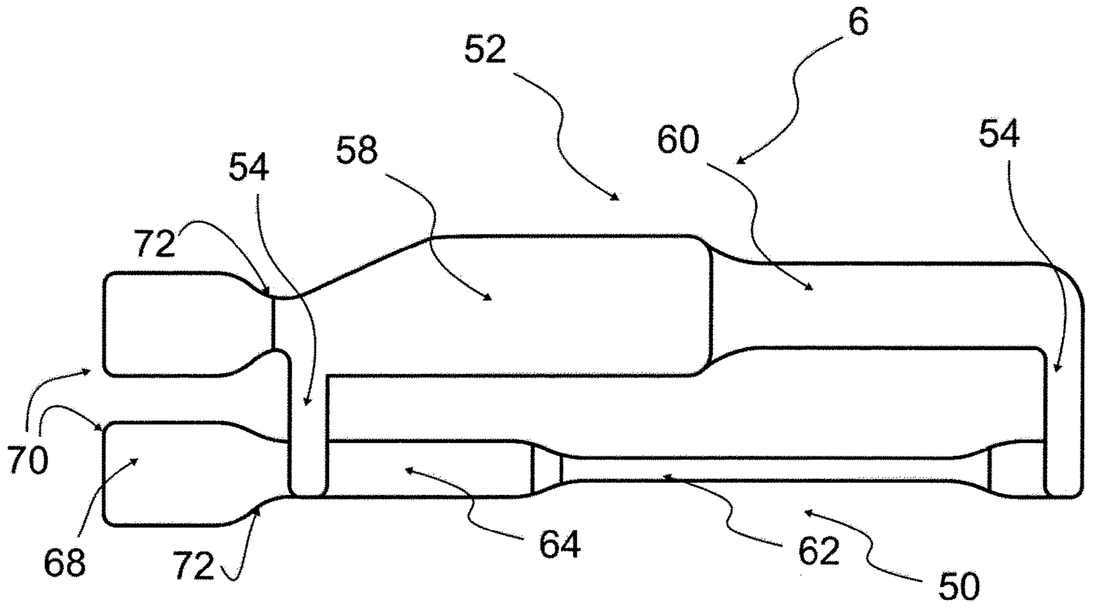
FIGS. 5-10 are schematic detailed views of an underside and of a side, different exemplary embodiments of a cavity of the sample carrier.

As can be seen from FIGS. 1 and 5, the process chamber 6 of the sample carrier 1 has a channel structure which runs in a ring shape and is in turn formed by a first channel section 50 and a second channel section 52. These channel sections 50 and 52 are elongate and run (at least approximately, i.e. optionally with an angular offset of a few, single-figure angular degrees) parallel to each other and (at least approximately parallel) to a radial which, in the intended operating state, is perpendicular to the axis of rotation 22. In other words, during the method, the two channel sections 50 and 52 are aligned in the direction of the centrifugal force during the intended rotation. The channel sections 50 and 52 are each fluidically connected at the ends by connection channels 54. In addition, the channel sections 50 and 52 are offset from each other in the direction of thickness of the base body 2, i.e. in the direction of the axis of rotation 22. Specifically, the first channel section 50 is offset toward a heat source in the normal state of use of the sample carrier 1, i.e. toward the heating chamber 24 in the present exemplary embodiment of the rotation device 10. Conversely, the second channel section 52 is offset toward the cooling chamber 28. In order to enable heat exchange between the air in the cooling chamber 28 and the process chamber 6, at least with the second channel section 52, the sample holder 18 has a window 56 through which air can flow from the cooling chamber 28 to the second channel section 52. Optionally, the second channel section 52 protrudes beyond the level of the heat input side 40 of the sample holder 18 and thus lies in the window 56 or even protrudes to the underside, i.e. into the cooling chamber 28 beyond the sample holder 18 (not shown).

Thus, in method step S3, comparatively more heat is introduced into the first channel section 50, on account of its greater "closeness" to the heating chamber 24 (as seen in relation to the second channel section 52) than into the second channel section 52. On account of the rotation of the sample holder 18 and the resulting relative movement to the air, the convective heat exchange of the two channel sections 50 and 52 with the heating chamber 24 and the cooling chamber 28 is also supported.

As a result of the heating of the first channel section 50 from the heating chamber 24 and the cooling of the second channel section 52 from the cooling chamber 28, a temperature gradient that runs parallel to the axis of rotation 22 forms within the channel structure of the process chamber 6. As a result of the rotation, an artificial gravitational field forms radially with respect to the axis of rotation 22. Furthermore, the temperature gradient leads to differences in density in the sample liquid. These temperature-related density differences, in conjunction with the artificial gravitational field, lead to a buoyancy-driven convection flow, the main flow direction of which is fundamentally radial on account of the artificial gravitational field. In other words, the main buoyancy component is directed radially inward. On account of the annular structure of the process chamber 6, liquid elements flow radially inward as a result of their heating in the first channel section 50 and the associated decrease in density. Correspondingly, as a result of the cooling in the second channel section 52 and the associated increase in density, liquid elements flow radially outward under the force of gravity. Since the two channel sections 50 and 52 are connected to form a ring, the liquid elements flow radially inward from the first channel section 50 through the connection channel 54 into the second channel section 52 and, at the end thereof, back into the first channel section 50. However, on account of the centrifugal forces of the rotation (directed to the right in FIG. 4) and the Coriolis force that is also present due to the rotation, there is also a (homogeneous) mixing of the sample liquid transversely with respect to the basic flow path of the convection flow. The speed of the convection flow increases as the speed of rotation increases.

Figure 6:
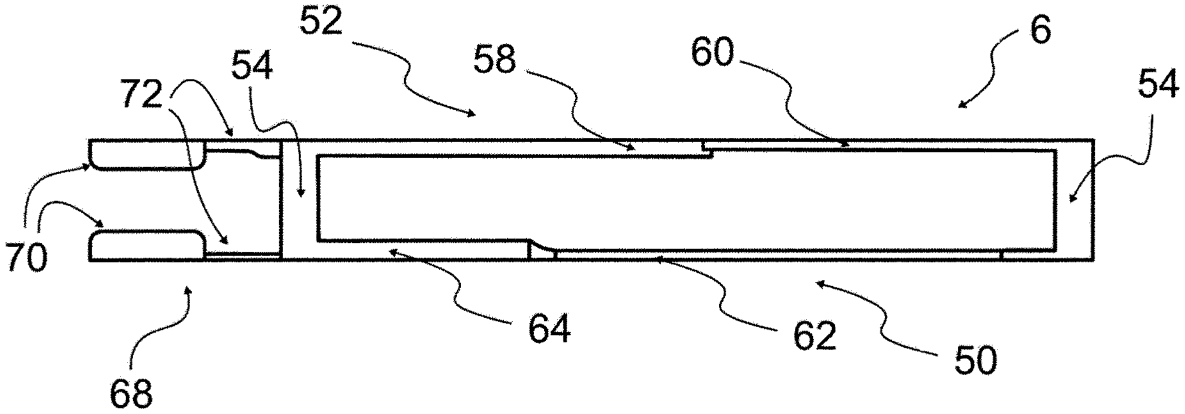

As can be seen from FIGS. 5 and 6, the second channel section 52 has two sub-chambers, of which the radially inner one is referred to as the "cooling channel 58" and the one connected to it radially to the outside as the "annealing channel 60". The cooling channel 58 has a greater width than the annealing channel 60 in the direction of the plane of the base body 2, thus permitting the fastest possible cooling to an "annealing temperature" of about 65 degrees Celsius. In this exemplary embodiment, the cross section of the annealing channel 60 is chosen to be smaller than that of the cooling channel 58, thereby permitting a comparatively higher outflow speed and thus a reduced heat dissipation, and also a lower heat loss at the transition to the first channel section 50.

The first channel section 50 also has two sub-chambers, of which the radially outer one is referred to as the resistance channel 62 and the radially inner one as the denaturation channel 64. The resistance channel 62 has a cross section that is further reduced in relation to the annealing channel 60 and also to the connection channel 54. As a result, the sample liquid is accelerated, and the flow through the annealing channel 60 is also controlled (or also predetermined). In the denaturation channel 64, the temperature (for example from 90 to 100, in particular about 95 degrees Celsius) can be kept at least approximately constant on account of the enlarged cross section of said channel in the present exemplary embodiment.

Figure 7:
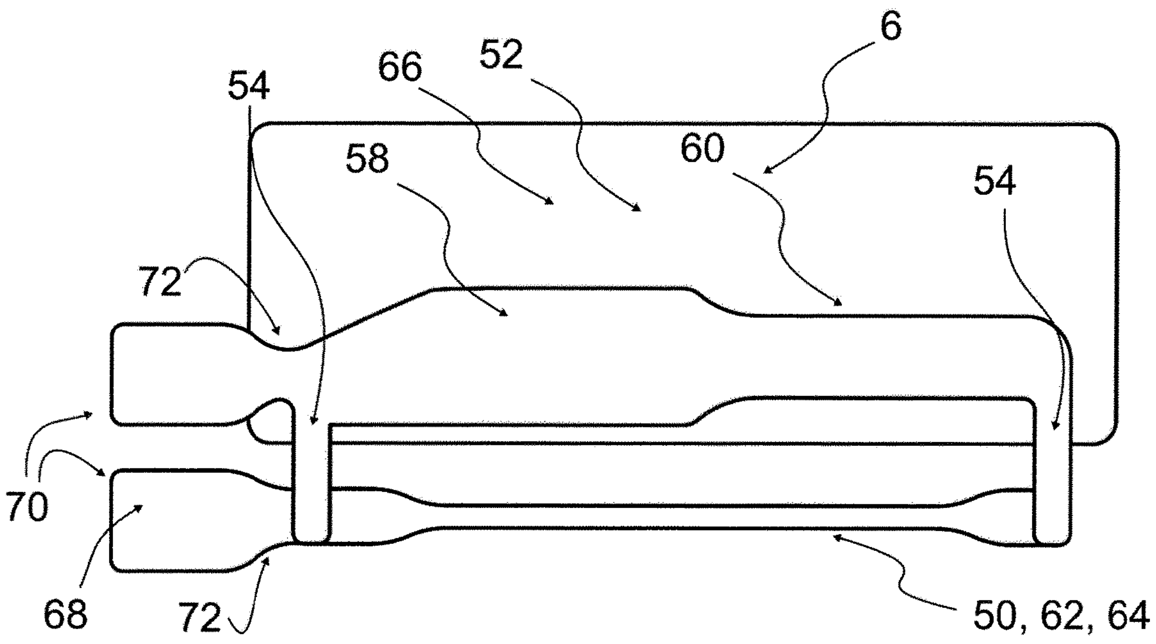
Figure 8:
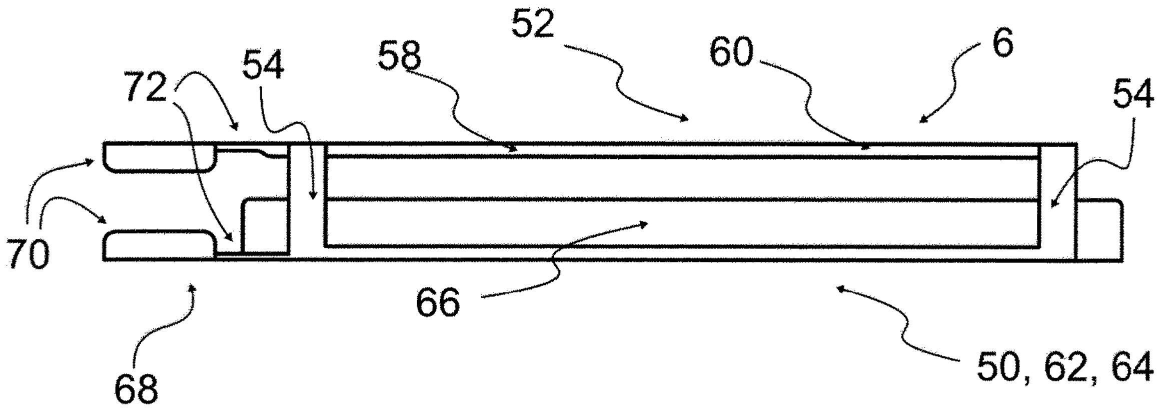

A further exemplary embodiment of the process chamber 6 is shown in FIGS. 7 and 8. The differences from the previous exemplary embodiment lie in the dimensions of the annealing channel 60 in relation to the cooling channel 58 and in the design of the first channel section 50. The annealing channel 60 has the same "depth" or "height" (i.e. the dimension in the direction of the axis of rotation 22) as the cooling channel 58. As a result, the flow is accelerated less than in the exemplary embodiment of FIGS. 5 and 6. The first channel section 50 is designed to be almost conformal over its entire length. A distinction between resistance channel 62 and denaturation channel 64 is not made here. The first channel section 50 is designed in the manner of a nozzle with a comparatively elongate, tapered central part. Denaturation also takes place here in the tapered central part as soon as the appropriate temperature is reached. This is possible in an exemplary embodiment, at least in the case of a rotation device with contact heating, in which the cross-sectional area of the first channel section 50 (in its tapered region) is 0.162 $mm^2$ and the second channel section 52 is designed in such a way that, at a rotational speed of 10 Hz of the sample carrier 1, the sample liquid remains in the first channel section 50 for such a time that the denaturation temperature value is reached. For higher speeds, the cross-sectional area of the first channel section 50 can be correspondingly reduced on account of the then higher flow rate.

In order to reduce the effect of the heated air of the heating chamber 24, or of another heating means, on the second channel section 52, the latter is underlaid with a thermal insulation layer 66. For example, the thermal insulation layer is a gas-filled "cushion", e.g. a hollow or foamed plate.

Figure 9:
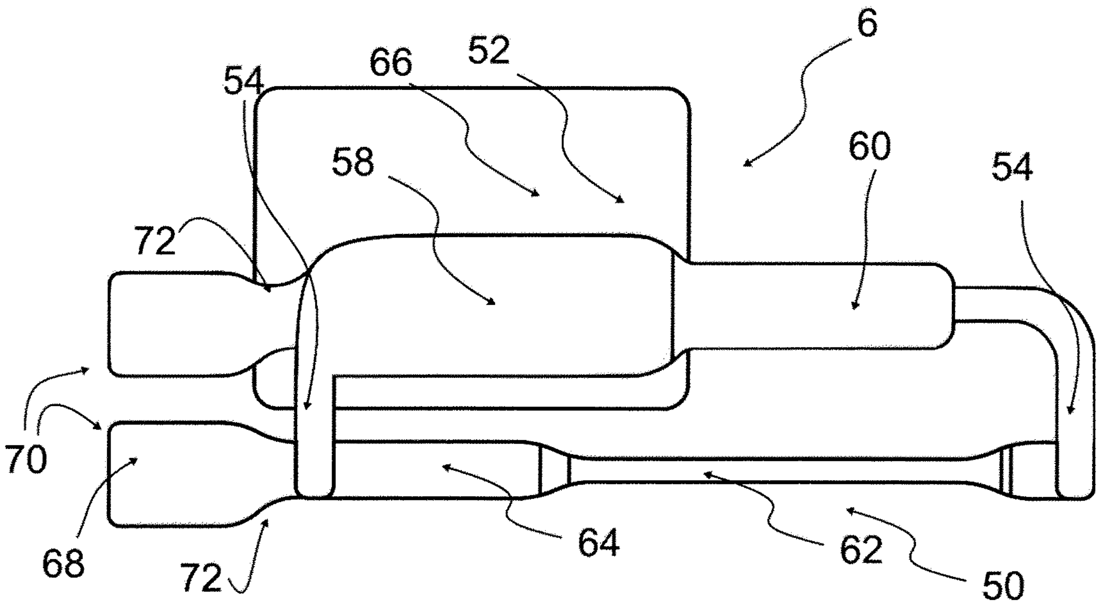
Figure 10:
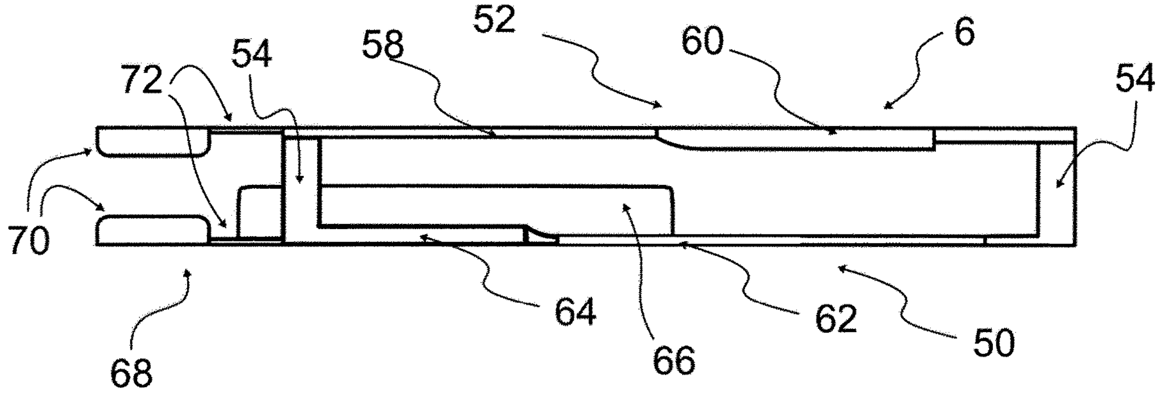

FIGS. 9 and 10 show a further exemplary embodiment of the process chamber 6. In this case, the annealing channel 60 is narrower but deeper than the cooling channel 58. As a result, the volume in the annealing channel 60 is increased, so that the heat loss can be kept low, although the thermal insulation layer 66 here is only placed underneath the cooling channel 58. Comparable to the exemplary embodiment according to FIGS. 5 and 6, the denaturation channel 64, once again of pronounced extent here, is designed with an enlarged cross section in relation to the resistance channel 62.

In each of the above-described exemplary embodiments, the first and second channel sections 50 and 52 are offset from each other in a tangential direction. On the one hand, this simplifies the intermediate storage of the thermal insulation layer 66, but on the other hand it also makes it possible, particularly in the case of the base body 2 being designed to be transparent at least in the region of the process chamber 6, to monitor the processes within the two channel sections 50 and 52, e.g. by means of a fluorescence detector or the like.

In addition, in each of the exemplary embodiments described above, the two channel sections 50 and 52 are assigned an inlet 68 (or also "inlet region"), via which the filling with the sample liquid takes place. This inlet 68 has two inlet chambers, also referred to as "bubble traps 70", each of which is fluidically connected to one of the two channel sections 50 and 52 via a gate 72. The amount of sample liquid supplied is selected in such a way that, after channel sections 50 and 52 have been filled as intended, i.e. when there is sample liquid in both channel sections 50 and 52 and in the connection channels 54, there is also some sample liquid in the bubble traps 70. The gates 72 are dimensioned in such a way that gas bubbles, which form during normal operation on account of the heating of the sample liquid, can "rise" through the gates counter to the artificial gravitational field into the bubble traps 70 and can collect there without "clogging" the gates. This is favored by the partially filled bubble traps 70.

The dimensions of the channel sections 50 and 52 and of the connection channels 54 are chosen in such a way that, at rotational speeds in the range of 5 to 40 Hz, the sample liquid in the annealing chamber 60 has a temperature value of about 65 degrees Celsius and, in the first channel section 50, has a temperature value above the melting temperature of the DNA, specifically above 90 degrees Celsius, in particular around 90 degrees Celsius.

In particular, method steps S1 to S3 can also take place at least partially at the same time. In particular, the sample holder 10 does not have to stand still while the process chamber 6 is being filled. Similarly, the heating device 26 can already heat the air in the heating chamber 24.

In an optional embodiment of the method, method step S3 is maintained for a specified duration. Then, in a fourth method step S4, the rotation of the sample holder 10 and the heating by means of the heating device 26 are stopped. Optionally, the fourth method step S4 can also be initiated if a sufficiently high conversion of reagents is detected by means of the abovementioned fluorescence detector.

The subject matter of the invention is not restricted to the exemplary embodiments described above. Rather, further embodiments of the invention can be derived from the above description by a person skilled in the art. In particular, the individual features of the invention that have been described with reference to the various exemplary embodiments, and the design variants thereof, can also be combined with one another in a different way.

The following is a summary list of reference numerals and the corresponding structure used in the above description of the invention.

LIST OF REFERENCE SIGNS 1 sample carrier
2 base body
4 filling chamber
6 process chamber
8 connection channel
10 rotation device
12 housing
14 side wall
16 analysis chamber
18 sample holder
20 rotary drive
22 axis of rotation
24 heating chamber
26 heating device
28 cooling chamber
30 cooling device
32 fan
34 valve
36 sealing gap
38 joint
39 groove
40 heat input side
50 channel section
52 channel section
54 connection channel
56 window
58 cooling channel
60 annealing channel
62 resistance channel
64 denaturation channel
66 thermal insulation layer
68 inflow
70 bubble trap
72 gate
S1-S4 method step

The invention claimed is:

1. A sample carrier system for use in a rotation-based method for amplification or detection of deoxyribonucleic acid (DNA), the sample carrier system comprising:
 a rotation device containing a top heating chamber and a bottom cooling chamber;
 a sampler carrier containing a disk-shaped base body having a plurality of cavities formed therein, configured to receive a sample liquid that contains the DNA, said disk-shaped base body further containing:
  a disk side forming a heat input side facing said top heating chamber;
  a flat side facing away from said disk side, facing said bottom cooling chamber and forming a heat output side;
  at least one of said cavities is formed by an annular channel with a first and a second channel section which are fluidically connected at both longitudinal ends by means of a respective connection section; and
  said first channel section disposed offset, in a thickness direction of said disk-shaped base body, with respect to said second channel section.

2. The sample carrier system according claim 1, wherein said first channel section is disposed on said heat input side and has a reduced cross-sectional area compared to said second channel section disposed on said heat output side.

3. The sample carrier system according to claim 1, wherein said first channel section is disposed on said heat input side and, compared to said second channel section disposed on said heat output side, has a reduced channel width oriented in a disk surface direction of said disk-shaped base body.

4. The sample carrier system according to claim 3, wherein said second channel section includes a cooling channel and, adjoining said cooling channel, an annealing channel formed with an increased depth compared to said cooling channel.

5. The sample carrier system according to claim 2, wherein said first channel section has a denaturation channel and, in front of said denaturation channel, a resistance channel formed with a reduced width compared to said denaturation channel.

6. The sample carrier system according to claim 1, wherein said first and said second channel section are offset from each other in a disk surface direction.

7. The sample carrier system according to claim 1, further comprising a thermal insulation layer which is disposed underneath said second channel section over at least part of its length in a direction of said heat input side.

8. The sample carrier system according to claim 1, further comprising a bubble trap chamber having in an inlet region, wherein said annular channel is connected to said bubble trap chamber via said inlet region through which said annular channel is filled during an intended use.

9. The sample carrier system according to claim 8, wherein said inlet region has a gate, which connects said bubble trap chamber to said annular channel, and has a thickness that gas bubbles which normally occur are able to pass through from said annular channel into said bubble trap chamber.

10. A rotation device for use in a rotation-based method for amplification or detection of deoxyribonucleic acid (DNA), the rotation device comprising:
- an analysis chamber;
- at least one sample carrier having a base body with a plurality of cavities formed in said base body, configured to receive in an intended operation, a sample liquid that contains the DNA;
- a sample holder disposed in said analysis chamber for holding said at least one sample carrier;
- a rotary drive by means of which said sample holder is rotated about an axis of rotation during the intended operation;
- a heating device by means of which an atmosphere in a subregion of said analysis chamber forming a top heating chamber is controlled to a target heating temperature during the intended operation;
- a cooling device by means of which, during the intended operation, an atmosphere in a subregion of said analysis chamber forming a bottom cooling chamber is controlled to a target cooling temperature, wherein said top heating chamber and said bottom cooling chamber are fluidically separated from each other by said sample holder, at least in cooperation with said sample carrier held thereon;
- a controller which is linked in terms of control technology to said rotary drive, said heating device and said cooling device and is configured to specify a speed of rotation of said sample holder and also the target heating temperature and the target cooling temperature; and
- said base body further containing:
  - a disk side forming a heat input side facing said top heating chamber; and
  - a flat side facing away from said disk side, facing said bottom cooling chamber and forming a heat output side.

11. The rotation device according to claim 9, further comprising a housing with a housing wall jointly enclosing said top heating chamber and said bottom cooling chamber, wherein said sample holder, or said at least one sample carrier held thereon during the intended operation, forms a sealing gap with said housing wall of said housing, said sealing gap is configured to reduce a gas exchange between said top heating chamber and said bottom cooling chamber.

12. The rotation device according to claim 11, wherein said housing wall forms, with said sample holder or said at least one sample carrier, a labyrinth seal between said top heating chamber and said bottom cooling chamber.

13. The rotation device according to claim 10, wherein said sample holder is configured to receive said at least one sample carrier on a heat input side facing said top heating chamber or on a cooling side facing said bottom cooling chamber, and wherein said sample holder has at least one window connecting said heat input side and said cooling side to each other, through which said at least one window a region of said plurality of cavities of said at least one sample carrier that is to be cooled or heated is accordingly connected, during the intended operation, to said bottom cooling chamber or said top heating chamber so as to permit heat transfer.

14. The rotation device according to claim 13, further comprising a thermal insulation layer disposed such that at least part of a region of said plurality of cavities of said at least one sample carrier that is to be cooled and/or heated is shielded, during the intended operation, from a temperature control effect of said top heating chamber or said bottom cooling chamber.

15. The rotation device according to claim 10, wherein said cooling device has:
- a controllable valve for connecting said bottom cooling chamber to an environment of the rotation device; and/or
- a fan for flooding said bottom cooling chamber with ambient atmosphere.

16. The rotation device according to claim 12, wherein said housing wall has a groove formed circumferentially therein, wherein said labyrinth seal between said top heating chamber and said bottom cooling chamber is formed by said sample holder or said at least one sample carrier engaging in said groove formed circumferentially in said housing wall.

17. A method for amplification or detection of deoxyribonucleic acid (DNA), which comprises the steps of:
- providing the sample carrier system according to claim 1;
- receiving the sample carrier, in which the sample liquid that at least potentially contains the DNA in a rotation device, and rotating the sample carrier about an axis of rotation by means of the rotation device;
- heating at least the first channel section to a given temperature value, at least in some sections, by means of an atmosphere that is temperature-controlled by means of a heating device of the rotation device; and
- generating, on account of the heating, a convection flow of the sample liquid within the annular channel of one of the cavities.

18. A method for amplification or detection of deoxyribonucleic acid (DNA), which comprises the steps of:
- providing the rotation device according to claim 10;
- rotating the at least one sample carrier having the plurality of cavities, in at least one of the cavities the sample liquid at least potentially containing the DNA is received, about an axis of rotation by means of the rotation device;
- heating at least one section of the cavity or several of the cavities to a given temperature value, at least in some sections, by means of an atmosphere that is temperature-controlled by means of the heating device; and generating, on account of the heating, a convection flow of the sample liquid within the cavity.

* * * * *